United States Patent [19]

Rensink et al.

[11] Patent Number: 5,121,316
[45] Date of Patent: Jun. 9, 1992

[54] ELECTRONIC SYSTEM AND METHOD FOR CORRECTING THE POWER FACTOR OF AN ACCESSORY TO A MAIN EQUIPMENT

[75] Inventors: Loman Rensink, Rancho Palos Verdes; Mario F. Cruz, Long Beach, both of Calif.

[73] Assignee: Modular Devices, Inc., Torrance, Calif.

[21] Appl. No.: 699,320

[22] Filed: May 13, 1991

[51] Int. Cl.⁵ .................. G05F 1/70; H02M 7/06
[52] U.S. Cl. .................................. 363/89; 363/44; 363/126
[58] Field of Search ............ 363/39, 44, 45, 46, 363/89, 126

[56] References Cited

U.S. PATENT DOCUMENTS

| | | | |
|---|---|---|---|
| 4,412,277 | 10/1983 | Mitchell | 363/89 |
| 4,555,753 | 11/1985 | Takahashi | 363/126 |
| 4,677,366 | 6/1987 | Wilkinson et al. | 363/89 |
| 4,683,529 | 7/1987 | Bucher, II | 363/44 |
| 4,688,162 | 8/1987 | Mutch et al. | 363/126 |
| 4,866,585 | 9/1989 | Das | 363/89 |
| 4,940,929 | 7/1990 | Williams | 363/89 |
| 5,003,454 | 3/1991 | Bruning | 363/89 |
| 5,006,975 | 4/1991 | Neufeld | 363/89 |

Primary Examiner—Peter S. Wong
Attorney, Agent, or Firm—Edward A. Sokolski

[57] ABSTRACT

An electronic power factor corrector for a main equipment is employed to correct the power factor of an accessory to the main equipment. A voltage signal is generated in accordance with the rectified current input to the accessory. This voltage signal is summed with a voltage signal in accordance with the sampled input current or the current in the return current path from the main equipment. The summation signal is fed to a differential amplifier where it is compared with a reference signal in accordance with the current input to the main equipment. The output of the differential amplifier is fed as a control signal to a switching current source circuit which controls the current drawn by the main equipment and accessory to maintain the power factor close to unity.

5 Claims, 4 Drawing Sheets

ELECTRONIC SYSTEM AND METHOD FOR CORRECTING THE POWER FACTOR OF AN ACCESSORY TO A MAIN EQUIPMENT

BACKGROUND OF THE INVENTION

1. Field of the Invention

This invention relates to power factor correction and more particularly to a system and method for correcting the electrical power factor of an accessory to a main equipment by utilizing the power factor corrector of the main equipment.

2. Description of the Related Art

In many high current commercial systems, a large part of the current drain is due to poor power factor(i.e. a substantial out of phase relationship between the voltage and current). This can cause a serious overloading of the electrical power system and may require special corrective action by the power company. In addition, a substantial surcharge is charged by most power companies to commercial users whose equipment presents a poor power factor to the power lines.

The widespread use of high frequency switching regulated power supplies in various type of commercial equipment presents a particular power factor problem in that such systems employ large energy storage, electrolytic capacitors at the output of the rectifier and the input to the DC-DC converter used to convert the rectified supply voltage to low voltage DC. Such capacitive loading results in a haversine pulsating current at the line frequency which tends to occur near the peak of the line voltage. This results in high RMS input currents, with substantial distortion and a low power factor on the input line. To alleviate this problem, new types of switching power supplies have been designed which incorporate active electronic power factor correction circuitry which effectively reduces the RMS current drain and the harmonic current distortion. Such power supplies are commercially available from various companies including Modular Devices Incorporated, Torrance, Calif. (models PS 2129, PS 2133 and PS2118). Power supplies of this type are described in various published articles including: "Correct Power Factor in Switched Mode Power Supplies" by Bradford Hall, published in Electronic Design magazine, Oct. 27, 1988 and "PWM Controlled Chip Fixes Power Factor" by Frank Goodenough, Electronic Design magazine, June 1989.

While a power factor corrected power supply is generally provided with a larger system, it is often not present in accessory equipment used with such a main equipment. Thus, while the main system has adequate power factor correction, the overall power factor presented to the line, in view of the load of the accessories may be unacceptable. This problem could, of course be solved either by providing a separate independent power factor corrector in the supplies for the accessories or by running such accessories from the high voltage DC in the main power supply. The first of these options is undesirable because it requires the modification of the power supply furnished with the accessory at substantial expense. The second option has the disadvantage of placing an additional load on the main power supply which could cause overloading.

SUMMARY OF THE INVENTION

The present invention solves the aforementioned problem by utilizing the power factor corrector of the main equipment to correct the power factor due to the load presented by a piece of accessory equipment. This end result is achieved without modifying the power supply of the accessory equipment and without placing the load of the accessory on the power supply of the main equipment. Further the desired end result is achieved at a minimum expense, with simple relatively inexpensive circuitry, and with only a single simple modification to the power factor corrector of the main equipment.

The present invention utilizes a step down transformer which is placed in series with the current path from the power line to the accessory power supply. The output of this transformer is rectified to provide a series of DC voltage pulses which are in accordance with the current drawn by the accessory. As mentioned above, a power supply having a capacitive filter causes a current load which is in the form of haversine pulses which appear generally near the peak of the voltage cycle resulting in a power factor well below unity. The voltage pulses in accordance with the current load of the accessory are summed in phase opposition with voltage pulses in accordance with the current load of the main equipment. This summed signal is used to control the switching current source of the main power factor corrector rather than only the signal responsive to the load current of the main equipment, as used in the prior art to effect such control. The current fed to the main equipment is thus modified to compensate for the current distortion of the accessory so that the total line current to both equipments is brought to an in phase relationship with the line voltage. Thus, power factor correction is achieved at the power line for both the main equipment and the accessory in a simple highly effective manner.

It is therefore an object of this invention to provide a simple and economical method and apparatus for correcting the power factor of an accessory to a main equipment having a power factor corrector.

It is another object of this invention to utilize the power factor corrector of a main equipment for correcting the power factor of an accessory equipment.

Other objects of the invention will become apparent from the following description in connection with the accompanying drawings.

DETAILED DESCRIPTION OF THE INVENTION

Figure 1:
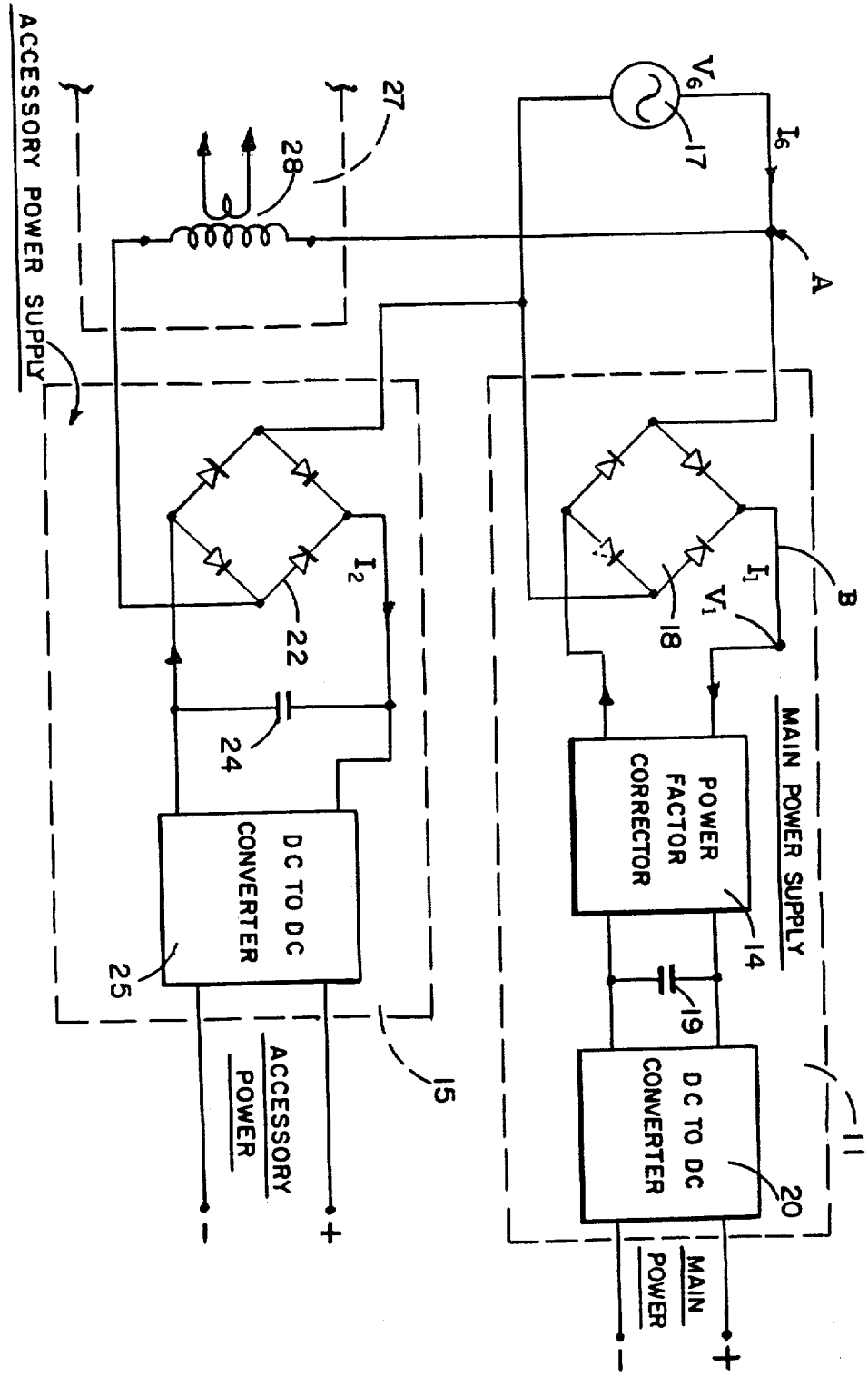
FIG. 1 is a functional block diagram illustrating a preferred embodiment of the invention.

Referring to FIG. 1, a preferred embodiment of the invention is illustrated in a functional block diagram. It is to be noted that the main power supply 11 including its power factor corrector 14 and accessory power supply 15 are prior art devices which are commercially available. Either power supply model no. PS2133 or PS2118 which are commercially available from Modular Devices, Inc., Torrance, Calif. may be utilized for power supply 11.

Figure 3:
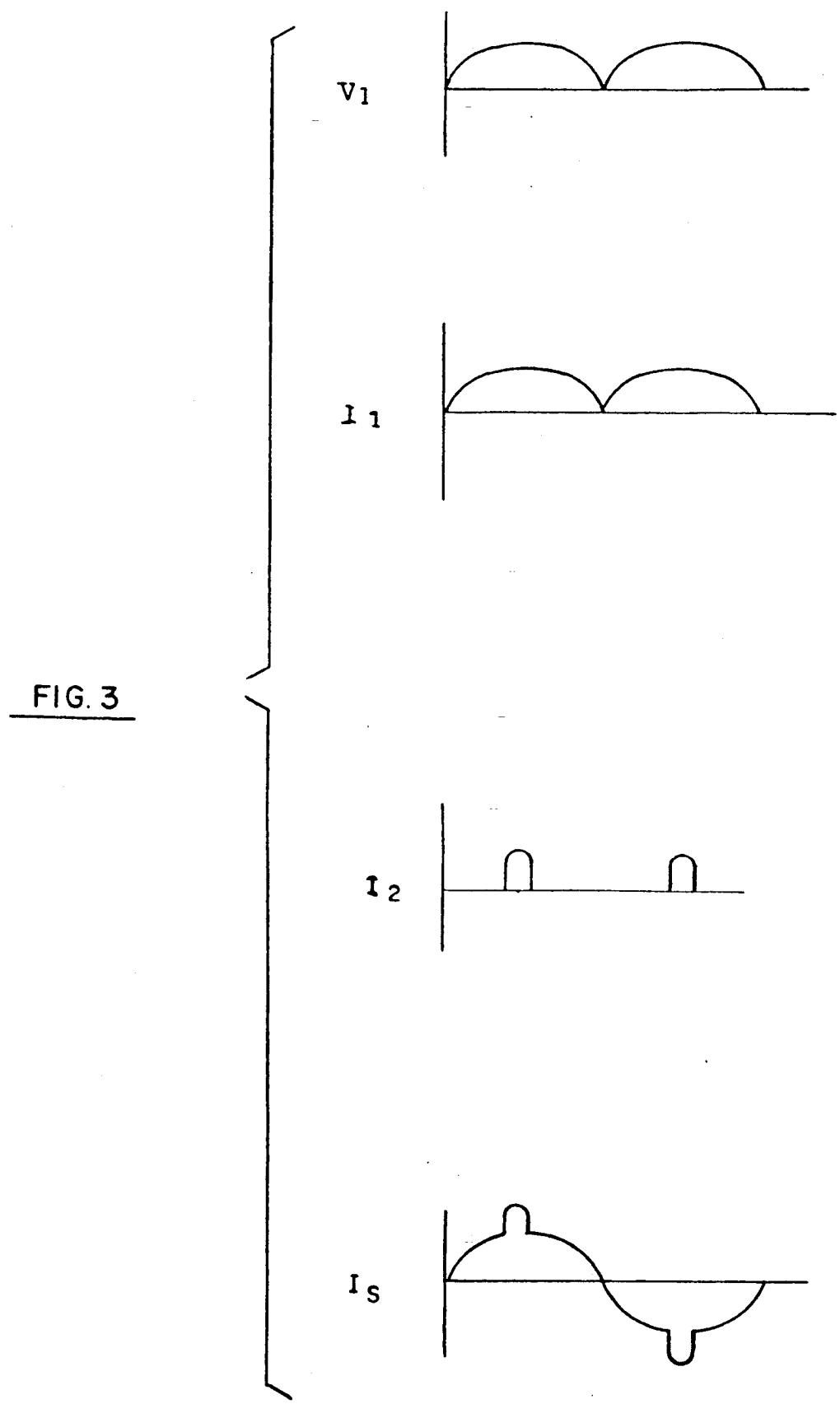
FIG. 3 is a series of waveforms illustrating phase distortion introduced by an accessory equipment.

AC line power 17 having a voltage $V_s$ and a current $I_s$, as shown as "A" in FIG. 3, provides power to main power supply 11 and accessory power supply 15. The power is rectified in the main power supply by means of bridge rectifier 18 to produce voltage, $V_l$ and current, $I_l$, as shown in FIG. 3. The power factor is corrected to unity by means of power factor corrector 14 and fed across smoothing capacitor 19 to DC-DC converter where the DC voltage is converted to the amplitude required for the main equipment.

The accessory power supply 15 includes a bridge rectifier 22 which provides rectified power across smoothing capacitor 24 to DC-DC converter 25 which converts the DC to the required voltage for the accessory equipment.

In the absence of any power factor correction for the accessory equipment, the current to the accessory, $I_2$, the voltage and current to the main equipment, $V_l$ and $I_l$, and the total supply current to both equipments, $I_s$ are as shown in FIG. 3. As can be seen the out of phase current contributed by the accessory results in a distortion pulse in the supply current thereby resulting in a lowered power factor. The system and method of the present invention eliminates this distortion pulse by introducing a compensating current into the main equipment through its power factor corrector which is equal and opposite to the distortion pulse and thus effectively cancels out this distortion in the total supply current to both equipments.

The novelty of the present invention lies in the accessory power factor corrector 27. The primary winding of transformer 28 is in series with one of the input lines to bridge rectifier 22 and thus this transformer provides a voltage at its secondary which is in accordance with the accessory current. The transformer both provides isolation and has a stepped down secondary to provide a lowered voltage in accordance with the accessory current for use in the accessory power factor corrector 27.

Figure 2:
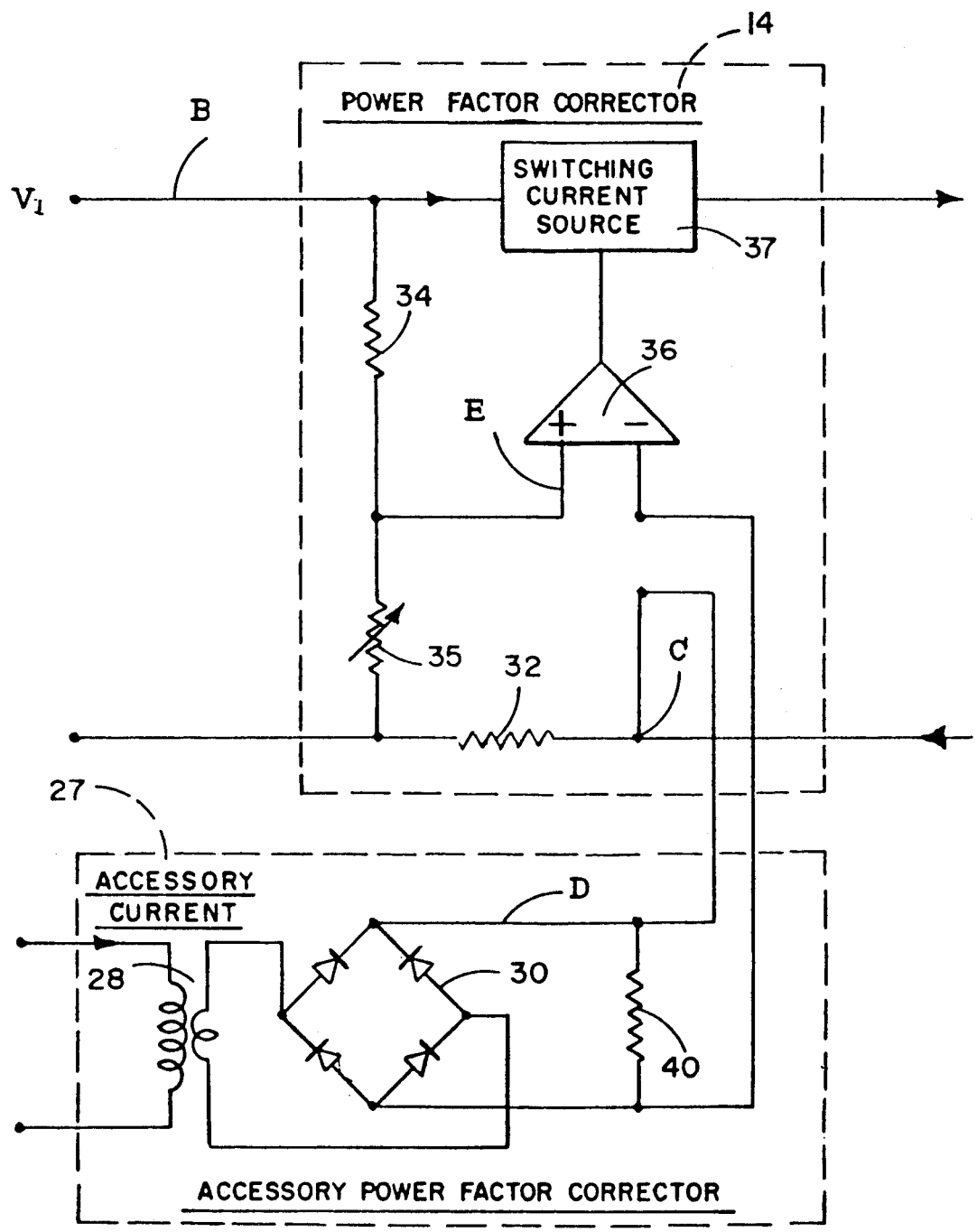
FIG. 2 is a schematic drawing illustrating the preferred embodiment of the invention.
Figure 3:
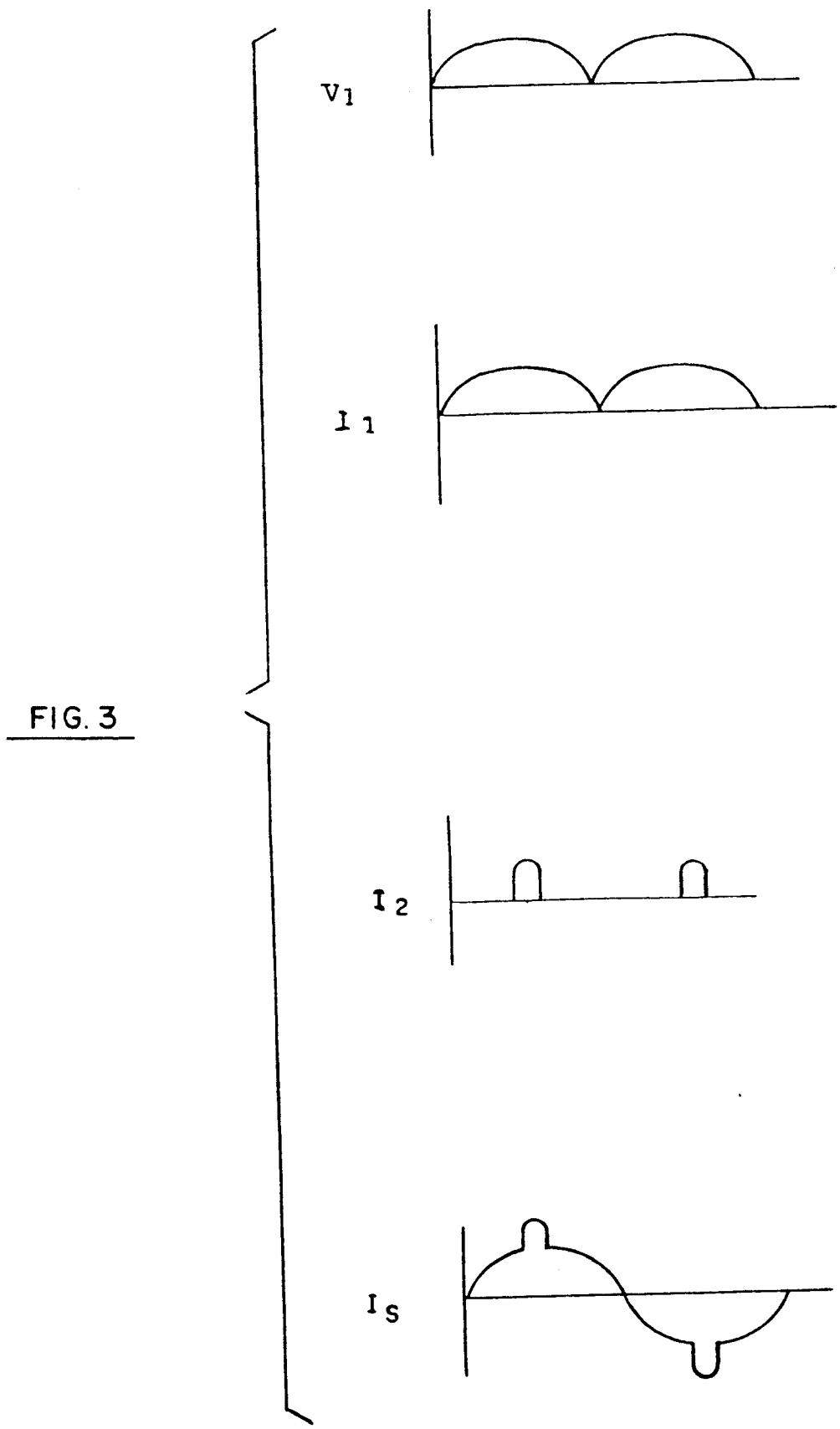
Figure 4:
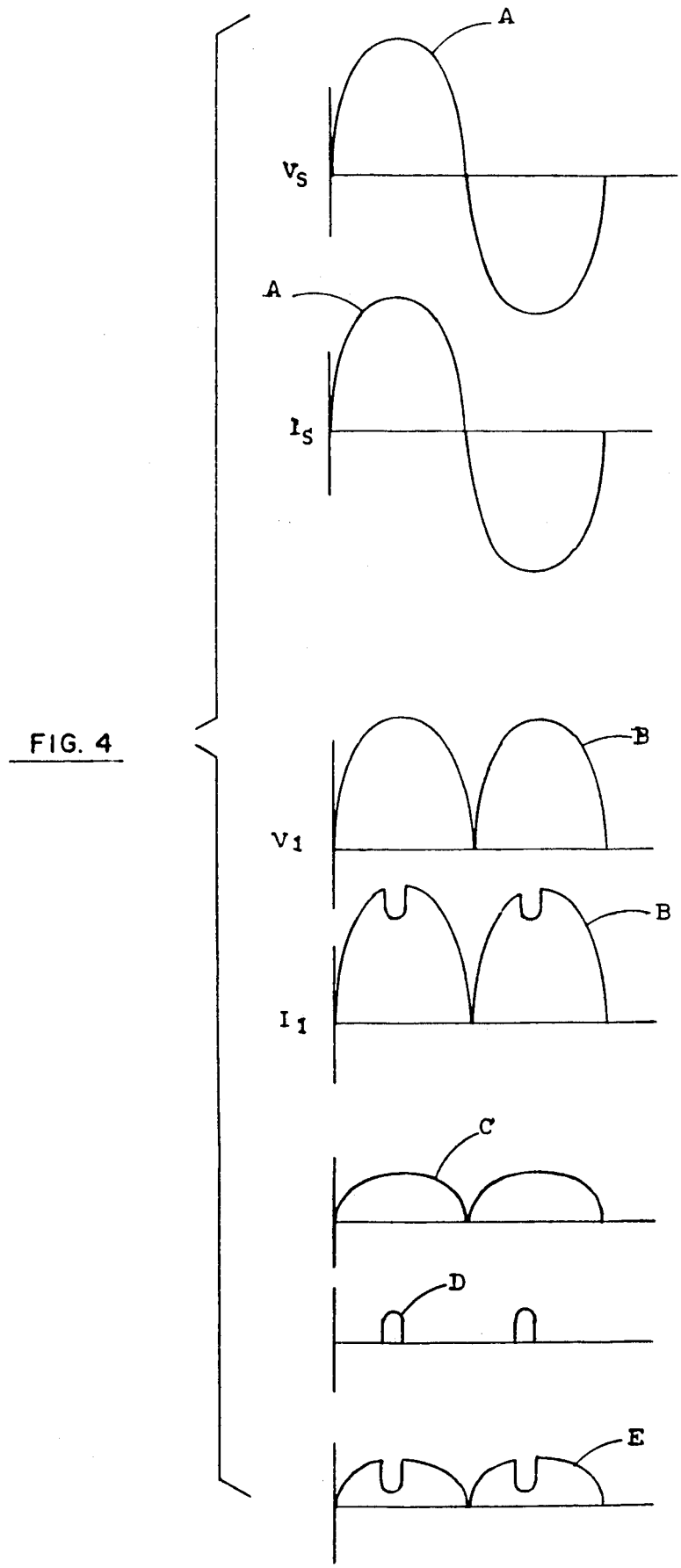
FIG. 4 is a series of waveforms illustrating the operation of the invention.

Referring now to FIG. 2, a preferred embodiment of the invention is schematically illustrated. The secondary winding of transformer 28 is connected to bridge rectifier 30 which provides a pulsating DC voltage output, "D" as shown in FIG. 4 which is in accordance with the current input to the accessory equipment. The return current from the main equipment passes through current sensing resistor 32 providing a voltage, "C" in accordance with this current, as shown in FIG. 4. A voltage which is in accordance with $I_l$ is reduced in value by means of the voltage divider formed by resistor 34 and gain control 35 and is fed to one of the inputs of operational amplifier 36. This voltage is adjusted to provide a desired reference voltage,"E" as shown in FIG. 4, scaled as required to properly match the scaling of the input provided to the other input of the amplifier. The output of the operational amplifier controls the current passed through switching current source 37 to maintain this current in phase with the supply voltage. How this end result may be achieved is described in the publications cited above.

The voltage output(shown at "D" in FIG. 4) of rectifier 30 generates a current flow through calibrating resistor 40 to provide a voltage signal of appropriate amplitude for summation with the sensed current output of the main power supply, as reflected by the voltage drop across resistor 32. These two signals are summed in phase opposition relationship to provide a signal at the inverting ("minus") input of the operational amplifier 34 which is similar to the signal "E" (See FIG. 4) which is fed to the non-inverting "plus" input of the amplifier. The operational amplifier 34 controls the current in the switching current source in response to any incipient difference between the two inputs thereto. As can be seen in FIG. 4, the current, $I_l$ drawn by the main equipment has a compensating "notch" formed therein which corresponds to the current distortion introduced by the accessory This notch is equal and opposite to the distortion current which would otherwise appear in the supply current, $I_s$ and thus cancels out this distortion current.

While the system and method of the invention has been shown for illustrative purposes in connection with only a single accessory, the power factors of several accessories can be compensated for in like manner by means of the power factor corrector of a single main equipment provided their current drains do not exceed the current handling capacity of the power supply for the main equipment.

While the invention has been described and illustrated in detail, it is to be clearly understood that this is intended by way of illustration and example only and is not to be taken by way of limitation, the scope of the invention being limited only by the terms of the following claims:

I claim:

1. In a power factor corrector for correcting the power factor of a power source for a first equipment, said power factor corrector including switching current source means, means for generating a control signal in accordance with the current supplied to said first equipment, and control means responsive to said control signal for controlling the current fed to said first equipment to maintain the power factor of the power fed from the power source for said equipment at unity, the improvement being a system for correcting the power factor of a second equipment receiving power from the same power source as said first equipment comprising:

means for sensing the current supplied to said second equipment, means for generating a voltage in accordance with the current supplied to said second equipment, and means for feeding said voltage to said control means in phase opposition to the control voltage in accordance with the current supplied to said first equipment, a current in accordance with the current supplied to said second equipment being subtracted from the current fed to said first equipment thereby correcting the current distortion in the supply current attributable to said second equipment.

2. The power factor corrector of claim 1 wherein said means for sensing the current supplied to said second equipment comprises a transformer having its primary winding in series with the current supplied to said second equipment and a stepped down secondary winding.

3. The power factor corrector of claim 2 wherein said means for generating a voltage in accordance with the current supplied to said second equipment comprises rectifier means for rectifying the current in said secondary winding, and calibrated resistor means connected across the output of said rectifier means for providing a voltage signal which is in accordance with the current fed to said second equipment and which is of a predetermined amplitude.

4. The power factor corrector of claim 1 and further including an operational amplifier, said means for feeding said voltage to said control means comprising summing circuit means for summing the voltages in accordance with the currents supplied to said first and second equipments, the output of said summing circuit means being fed to one of the inputs of said operational amplifier, and means for generating a reference voltage in accordance with the current supplied to said first equipment, said reference voltage being fed to other of the inputs of said operational amplifier, the output of said operational amplifier being fed to said control means as the control signal therefor.

5. A method for correcting the power factor of a second equipment by utilizing the power factor corrector of a first equipment, said first and second equipments receiving power from the same power source, comprising the steps of:

connecting a current sensing transformer in series with the current supply to said second equipment, converting the current sensed by said transformer to a voltage in accordance therewith, and feeding said voltage to the power factor corrector of said first equipment to modify the current drawn by said first equipment from said power source in accordance with the sensed current to correct any reduction in power factor at the power source attributable to said second equipment.

\* \* \* \* \*

UNITED STATES PATENT AND TRADEMARK OFFICE
CERTIFICATE OF CORRECTION

PATENT NO. : 5,121,316

DATED : June 9, 1992

INVENTOR(S) : Loman Rensink, et al.

It is certified that error appears in the above-identified patent and that said Letters Patent is hereby corrected as shown below:

Sheet 1 of the drawing, consisting of fig. 3, should be deleted to be replaced with the attached sheet.

Signed and Sealed this

Twenty-seventh Day of April, 1993

Attest:

MICHAEL K. KIRK

*Attesting Officer*     Acting Commissioner of Patents and Trademarks